US 9,568,204 B2

(12) United States Patent
Asmus et al.

(10) Patent No.: US 9,568,204 B2
(45) Date of Patent: Feb. 14, 2017

(54) SYSTEMS AND METHODS FOR RAPID DISTURBANCE DETECTION AND RESPONSE

(71) Applicant: Johnson Controls Technology Company, Holland, MI (US)

(72) Inventors: Matthew J. Asmus, Watertown, WI (US); Robert D. Turney, Watertown, WI (US); Justin J. Seifi, Thiensville, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 480 days.

(21) Appl. No.: 13/756,229

(22) Filed: Jan. 31, 2013

(65) Prior Publication Data
US 2014/0214214 A1    Jul. 31, 2014

(51) Int. Cl.
*F24F 11/00* (2006.01)
*G01D 3/02* (2006.01)
*G01D 3/08* (2006.01)

(52) U.S. Cl.
CPC ............. *F24F 11/001* (2013.01); *G01D 3/021* (2013.01); *G01D 3/08* (2013.01); *F24F 2011/0053* (2013.01)

(58) Field of Classification Search
CPC . F24F 11/001; F24F 11/006; F24F 2011/0061; F24F 2011/0053; G01D 18/00; G01D 18/004; G01D 18/008; G01D 3/021; G01D 3/08
USPC ............................ 700/276; 702/58, 104, 183
See application file for complete search history.

(56) References Cited

U.S. PATENT DOCUMENTS

| | | | | |
|---|---|---|---|---|
| 4,031,463 A | * | 6/1977 | Norberg | ..................... 324/76.16 |
| 5,118,968 A | * | 6/1992 | Douglas | ............... H03K 17/302 |
| | | | | 327/76 |
| 5,464,369 A | * | 11/1995 | Federspiel | ..................... 454/256 |
| 5,822,740 A | * | 10/1998 | Haissig et al. | .................... 706/3 |
| 6,145,751 A | * | 11/2000 | Ahmed | ........................... 236/51 |
| 6,427,461 B1 | | 8/2002 | Whinery et al. | |
| 6,502,061 B1 | * | 12/2002 | Segawa | ......................... 702/181 |
| 6,644,049 B2 | | 11/2003 | Alford | |
| 6,919,809 B2 | | 7/2005 | Blunn et al. | |
| 7,149,605 B2 | * | 12/2006 | Chassin | .................... H02J 3/14 |
| | | | | 700/286 |

(Continued)

OTHER PUBLICATIONS

FX-15 "Classic" HVAC/R Controller Product Bulletin, Johnson Controls, 2002, p. 4.*

(Continued)

*Primary Examiner* — Ben Rifkin
*Assistant Examiner* — Michael J Huntley
(74) *Attorney, Agent, or Firm* — Foley & Lardner LLP

(57) ABSTRACT

A method for detecting and responding to disturbances in a HVAC system using a noisy measurement signal and a signal filter is provided. The method includes detecting a deviation in the noisy measurement signal, resetting the filter in response to a detected deviation exceeding a noise threshold, filtering the noisy measurement signal using the signal filter to determine an estimated state value, and determining that a disturbance has occurred in response to the estimated state value crossing a disturbance threshold. In some embodiments, the method further includes performing one or more control actions in response to the detection of a disturbance.

18 Claims, 9 Drawing Sheets

(56) References Cited

U.S. PATENT DOCUMENTS

| | | | |
|---|---|---|---|
| 7,243,004 B2 | 7/2007 | Shah et al. | |
| 7,590,469 B2 | 9/2009 | Grohman | |
| 7,600,694 B2 | 10/2009 | Helt et al. | |
| 7,650,206 B2 | 1/2010 | Hudson | |
| 7,821,218 B2 | 10/2010 | Butler et al. | |
| 7,837,128 B2 | 11/2010 | Helt et al. | |
| 7,840,311 B2 | 11/2010 | Grohman | |
| 7,844,764 B2 | 11/2010 | Williams | |
| 7,894,512 B2* | 2/2011 | Beadle | G01S 5/0294 375/224 |
| 8,841,801 B2* | 9/2014 | Jokinen | H02H 3/025 307/154 |
| 2004/0024559 A1* | 2/2004 | Down et al. | 702/127 |
| 2004/0190211 A1* | 9/2004 | Ockert et al. | 361/92 |
| 2006/0165149 A1* | 7/2006 | Kolk | 374/1 |
| 2006/0267756 A1* | 11/2006 | Kates | 340/521 |
| 2010/0174506 A1* | 7/2010 | Joseph | G01C 21/165 702/141 |
| 2010/0250009 A1 | 9/2010 | Lifson et al. | |
| 2010/0286799 A1 | 11/2010 | Matsen et al. | |
| 2010/0298981 A1 | 11/2010 | Chamorro et al. | |
| 2010/0298982 A1 | 11/2010 | Chamorro et al. | |
| 2010/0298983 A1 | 11/2010 | Beste et al. | |
| 2010/0298984 A1 | 11/2010 | Mauk et al. | |
| 2010/0298987 A1 | 11/2010 | Bennett et al. | |
| 2010/0298988 A1 | 11/2010 | Stachler et al. | |
| 2010/0298989 A1 | 11/2010 | Hess et al. | |
| 2011/0007944 A1* | 1/2011 | Atrazhev et al. | 382/103 |
| 2011/0097988 A1 | 4/2011 | Lord | |
| 2012/0016525 A1* | 1/2012 | Davis | 700/276 |
| 2012/0185728 A1* | 7/2012 | Guo et al. | 714/26 |
| 2012/0276517 A1* | 11/2012 | Banaszuk et al. | 434/365 |
| 2012/0330465 A1* | 12/2012 | O'Neill et al. | 700/276 |
| 2016/0064940 A1* | 3/2016 | De La Cropte De Chanterac | H02J 7/0029 307/31 |

OTHER PUBLICATIONS

M. H. Bahari, A. Karsaz, and M. B. Naghibi-S, "Intelligent Error Covariance Matrix Resetting for Maneuver Target Tracking", Journal of Applied Sciences, vol. 8, issue 12, 2008, pp. 2279-2285 (accessed from <<http://www.docsdrive.com/pdfs/ansinet/jas/2008/2279-2285.pdf>> on Mar. 15, 2016).*

K. Srinivasarengan; L. Mutyam; M. N. Belur; M. Bhushan; A. P. Tiwari; M. G. Kelkar; and M. Pramanik, "Flux estimation from Vanadium and Cobalt Self Powered Neutron Detectors (SPNDs): Nonlinear exact inversion and Kalman filter approaches", IEEE Xplore (from <<http://ieeexplore.ieee.org/xpl/abstractAuthors.jsp?arnumber=6315321&tag=1>> on Mar. 15, 2016).*

Kai Xiong, Hongyue Zhang and Liangdong Liu, "Adaptive Robust Extended Kalman Filter", Kalman Filter: Recent Advances and Applications chapter 5, I-Tech, Croatia, Apr. 2009 (accessed from <<http://www.zums.ac.ir/files/research/site/ebooks/Numerical%20Analysis%20and%20Scientific%20Computing/Kalman_Filter.pdf on Mar. 15, 2016).*

Welch et al., An Introduction to the Kalman Filter, Jul. 24, 2006, 16 pages.

* cited by examiner

SYSTEMS AND METHODS FOR RAPID DISTURBANCE DETECTION AND RESPONSE

BACKGROUND

The present invention relates generally to the field of heating, ventilation, and air conditioning (HVAC) systems. The present invention relates more particularly to systems and methods for detecting and responding to a disturbance in a HVAC system in the presence of a noisy data signal produced by a measurement device.

HVAC control systems are typically used to monitor and control temperature, humidity, air flow, air quality, and other conditions within a building or building system. HVAC measurement devices (e.g., temperature sensors, pressure sensors, flow sensors, etc.) can produce noisy data signals. Noise in a data signal can hinder the operation of a HVAC controller and may prevent the HVAC system from achieving optimal control. For example, noise in a data signal can delay or prevent a controller from recognizing a real disturbance to the system.

Some HVAC equipment is configured to automatically collect, analyze, and report performance data. One potential problem in HVAC systems is that aging or damaged components (e.g., contactors in a compressor unit) can cause the supply line voltage to decrease or "sag." If the supply line voltage drops below a minimum necessary value, the HVAC equipment may begin to turn on and off intermittently. This behavior can cause other problems in a HVAC system including equipment damage or inaccurate diagnostic results. Noise in a measured voltage signal can delay or prevent recognition of a disturbance in the supply voltage, providing one example of a challenge caused by noisy measurements.

Various signal processing techniques have been used to reduce or eliminate noise in a measured signal. However, conventional noise reduction techniques are computationally expensive and often produce a signal which "lags" behind the measured values, providing challenges to the process of disturbance detection. In the presence of a noisy measurement signal, it is challenging to detect and respond to disturbances in a HVAC system.

SUMMARY

One embodiment of the present disclosure is a method for detecting and responding to disturbances in a HVAC system using a noisy measurement signal and a signal filter. The method includes detecting a deviation in the noisy measurement signal, resetting the filter in response to a detected deviation exceeding a noise threshold, filtering the noisy measurement signal using the signal filter to determine an estimated state value, and determining that a disturbance has occurred in response to the estimated state value crossing a disturbance threshold. In some embodiments, the method further includes performing one or more control actions in response to the disturbance.

In some embodiments, the disturbance threshold is a brownout voltage threshold or a blackout voltage threshold and the one or more control actions include deactivating a power relay or preventing a power relay from activating.

In some embodiments, the filter is a Kalman filter and filtering the noisy signal includes receiving an initial estimate for the estimated state value and for an error covariance, computing a Kalman gain using the error covariance, and updating the estimated state value using the Kalman gain and a measured value received from a device of the HVAC system. In some embodiments, resetting the filter includes increasing a process noise covariance, thereby increasing a responsiveness of the filter to the deviation in the measured values.

In some embodiments, the deviation in the measured values is one of a difference between two or more of the measured values, a difference between one of the measured values and a steady state value, and a standard deviation of two or more of the measured values. The HVAC device may be one of a chiller, a boiler, an air handling unit, a flow controller, a field controller, a supervisory controller, an actuator, a signal relay, a temperature sensor, a pressure sensor, and a voltage sensor. The measured values may be measurements of at least one of a temperature, a pressure, a voltage, a flow rate, a power usage, and an electric current.

In some embodiments, the measured values are voltage measurements and the estimated state value is an estimated voltage. In such embodiments, determining whether a disturbance has occurred includes comparing the estimated voltage to the disturbance threshold and determining that a disturbance has occurred if the estimated voltage is less than the disturbance threshold. In some embodiments, the disturbance threshold is a two-tiered threshold including a brownout voltage threshold and a blackout voltage threshold less than the brownout voltage threshold. The voltage may be an AC voltage and an oscillatory period of the AC voltage may define a line cycle. In some embodiments, it is determined that a disturbance has occurred within three line cycles of the disturbance occurring.

Another embodiment of the present disclosure is a system for responding to disturbances in the presence of noise. The system includes a sensor configured to measure one or more values in an HVAC system and produce a noisy signal including the one or more measured values. The system further includes a processing circuit configured to filter the noisy signal using a filter, determine an estimated state value, reset the filter in response to a deviation in the measured values, and determine whether a disturbance has occurred based on the estimated state value. The processing circuit may reset the filter when the deviation in the measured values exceeds a noise threshold and determine that a disturbance has occurred when the estimated state value crosses a disturbance threshold.

In some embodiments, the processing circuit is further configured to perform one or more control actions in response to the disturbance including at least one of modifying a setpoint for a device of the HVAC system and controlling an activation status a device of the HVAC system. In some embodiments, the disturbance threshold is a brownout voltage threshold or a blackout voltage threshold and wherein controlling an activation status for a device of the HVAC system includes deactivating a power relay or preventing a power relay from activating.

In some embodiments, the filter is a Kalman filter and the processing circuit is configured to receive an initial estimate for the estimated state value and for an error covariance, compute a Kalman gain using the error covariance, and update the estimated state value using the Kalman gain and a value measured by the sensor. Resetting the filter may include increasing a process noise covariance, thereby increasing a responsiveness of the filter to the deviation in the measured values.

In some embodiments, the processing circuit is configured to calculate the deviation in the measured values. The deviation may be one of a difference between two or more of the measured values, a difference between one of the measured values and a steady state value, a variance of two or more of the measured values, and a standard deviation of two or more of the measured values. In some embodiments, the sensor is configured to measure at least one of a temperature, a pressure, a voltage, a flow rate, a power usage, and an electric current.

In some embodiments, the measured values are voltage measurements and the estimated state value is an estimated steady state voltage. In such embodiments, the processing circuit may be configured to compare the estimated steady state voltage to the disturbance threshold and determine that a disturbance has occurred if the estimated steady state voltage is less than the disturbance threshold. In some embodiments, the disturbance threshold is a two-tiered threshold including a first threshold and a second threshold. The first threshold may be a brownout voltage value and the second threshold may be a blackout voltage value less than the brownout voltage value. In some embodiments, the voltage is an AC voltage and an oscillatory period of the AC voltage defines a line cycle. The processing circuit may determine that a disturbance has occurred within three line cycles of the disturbance occurring.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Before turning to the figures which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for detecting and responding to disturbances in a HVAC system are shown. In some implementations, the disturbances may be fluctuations in a power supply (e.g., a power line voltage) for HVAC equipment. In other implementations, the disturbances may be temperature disturbances, flow disturbances, pressure disturbances, or any other type of disturbance to which a HVAC system may be subjected. Advantageously, the systems and methods described herein facilitate the detection of such disturbances in the presence of a noisy data signal. A Kalman filter may be used to filter the data signal and to predict an estimated state for a variable measured by the data signal. The filter may be "reset" (e.g., by increasing a process noise covariance parameter) when a deviation in the measured data signal exceeds a threshold value. Resetting the filter may cause the estimated state to increase or decrease quickly in response to a disturbance to a system. Using the systems and methods described herein, disturbances may be detected shortly after they occur, thereby allowing immediate and responsive control actions to be taken.

Figure 1:
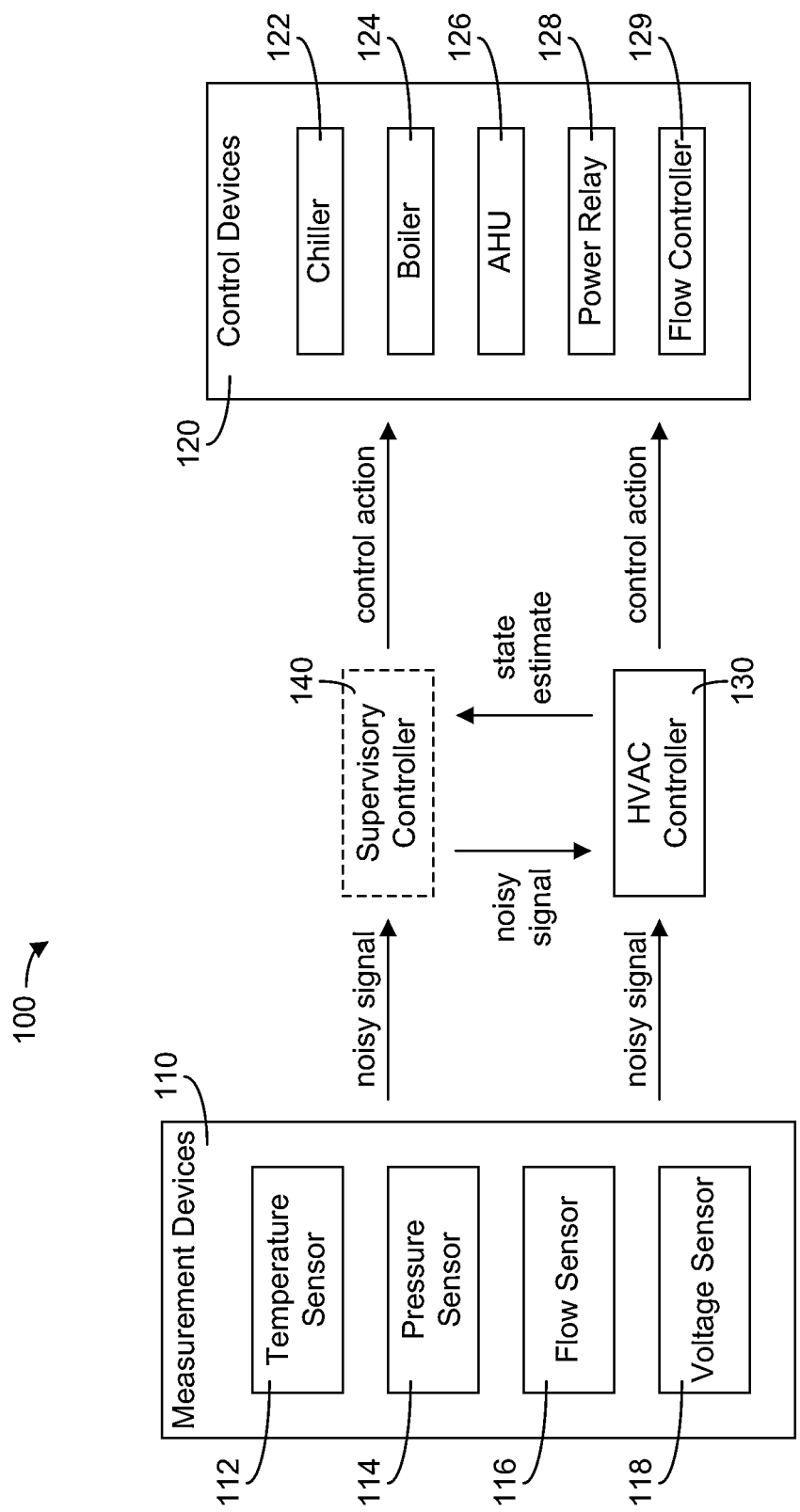
FIG. 1 is a block diagram of a HVAC control system including measurement devices, control devices, a HVAC controller, and a supervisory controller, according to an exemplary embodiment.

Referring now to FIG. 1, a block diagram of a HVAC control system 100 is shown, according to an exemplary embodiment. Control system 100 may be used to monitor and control any number of conditions, states, or variables within a building or building system. In some embodiments, control system 100 is a local control system (e.g., local to a building, building zone, building system, etc.). In other embodiments, control system 100 is a distributed or remote control system. Control system 100 may be used to control a single HVAC device (e.g., a chiller, boiler, air handling unit, damper, etc.), a plurality of HVAC devices within a single building or building system, or a plurality of HVAC devices spread throughout several buildings or discrete building systems. In some embodiments, HVAC control system 100 is part of a comprehensive building automation system such as a METASYS® brand building automation system sold by Johnson Controls, Inc. HVAC control system 100 is shown to include measurement devices 110, control devices 120, and HVAC controller 130.

Measurement devices 110 may include any number of sensors, detectors, or input devices capable of measuring, sensing, or recording a variable condition or state within a building or building system. Measurement devices 110 are shown to include a temperature sensor 112, a pressure sensor 114, a flow sensor 116, and a voltage sensor 118. However, any number or type of measurement devices 110 may be present. In some embodiments, measurement devices 110 include other types of sensors (e.g., magnetic sensors, electrostatic sensors, electric current sensors, optical sensors, distance sensors, etc.) in addition to or in place of the sensors shown in FIG. 1. Measurement devices 110 may translate a measured variable (e.g., temperature, pressure, flow rate, voltage, electric current, etc.) into a numerical data signal. In some embodiments, measurement devices 110 may include an analog-to-digital converter for translating an analog measurement into a digital data value. In other embodiments, measurement devices 110 provide raw values which are transformed by a controller such as controller 130.

Measurement devices 110 and controller 130 may be configured to record a plurality of measurements (e.g., data samples). In some embodiments, the measurements may be recorded upon regular time intervals. For example, voltage sensor 118 may be configured to record a voltage measurement every millisecond, second, minute, etc. In other embodiments, the measurement intervals may be irregular or adaptive (e.g., based upon the value of the measured variable). For example, voltage sensor 118 may be configured to record a voltage measurement every millisecond and to increase the sampling rate (e.g., to ten samples per millisecond) if the measured data value meets certain conditions. In some embodiments, the sampling rate may be adaptively set by HVAC controller 130 based on the values (e.g., absolute value, difference, standard deviation, etc.) of the measured variable. Measurement devices 110 may output a data signal including one or more of the measured values. In some embodiments, the data signal may include a data value and time value for each data measurement.

Still referring to FIG. 1, control system 100 is shown to include a plurality of control devices 120. Control devices 120 may include any number of devices capable of affecting (e.g., increasing, decreasing, holding constant, etc.) a condition or state (e.g., temperature, humidity, air quality, flow rate, etc.) of a building or building system. Control devices 120 are shown to include a chiller 122, a boiler 124, an air handling unit (AHU) 126, a power relay 128, and a flow controller 129 (e.g., a variable air volume (VAV) box, a damper, etc.). However, different numbers or types of control devices 120 may be present. In some embodiments, for example, control devices 120 may be or include control devices such as radiators, compressors, fans, condensers, or valves in addition to or in place of the control devices shown in FIG. 1.

Figure 2:
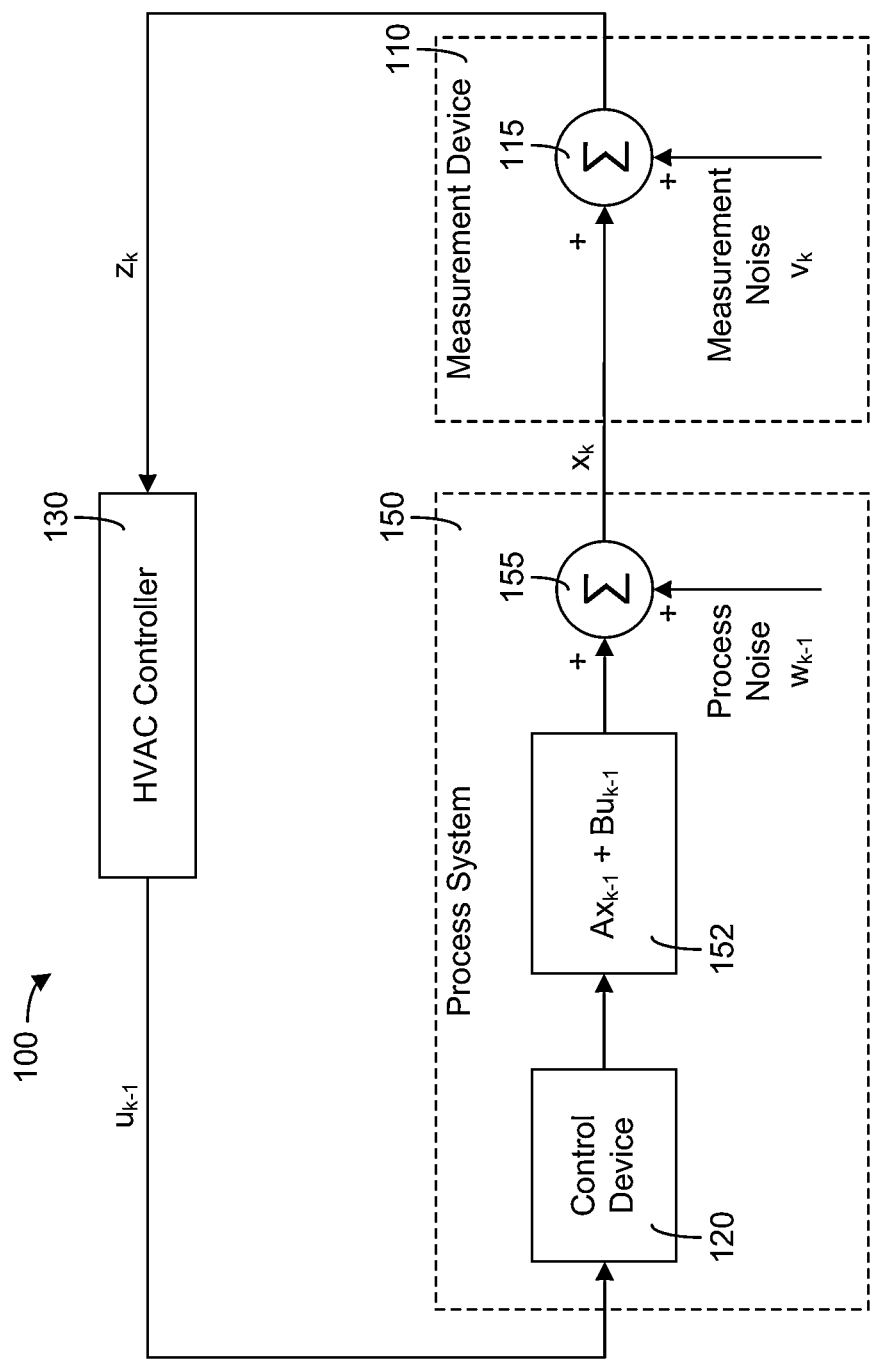
FIG. 2 is a block diagram of the HVAC control system of FIG. 1 implemented as a closed-loop feedback control system, according to an exemplary embodiment.

In some embodiments, system 100 is a closed-loop control system (as shown in FIG. 2). In a closed-loop system, control devices 120 may be devices for controlling one or more of the variables measured by measurement devices 110 (e.g., temperature, pressure, flow rate, voltage, etc.). In some embodiments, control devices 120 may be integrated with measurement devices 110. For example, AHU 126 or flow controller 129 may include a pressure sensor 114 (e.g., a differential pressure sensor, a static pressure sensor, etc.) or flow sensor 116 (e.g., a flow rate sensor, a flow velocity sensor, etc.). In some embodiments, a single control device 120 may affect one or more quantities measured by measurement devices 110. For example, AHU 126 may affect the temperature measured by temperature sensor 112 and the flow rate measured by flow sensor 116. Similarly, two or more control devices 120 may affect a single measured quantity. For example, chiller 122 and AHU 126 may both affect a measured temperature.

In some embodiments, control devices 120 affect a measured quantity by varying an input supplied to a controlled system (e.g., a building or system of buildings, etc.). For example, chiller 122 may affect a measured temperature by turning on or off a compressor-based refrigerant system. Thus, when chiller 122 is turned on, mechanical cooling may be provided to a controlled building, thereby controllably decreasing the temperature measured by temperature sensor 112. Power relay 128 may affect a voltage measured by voltage sensor 118 by turning on or off. When power relay 128 is turned on, any HVAC device (e.g., chiller, compressor, AHU, etc.) connected to or using power relay 128 may be permitted to draw power from a shared power supply line, thereby causing the measured voltage to decrease or sag.

Still referring to FIG. 1, control system 100 is shown to include a HVAC controller 130. HVAC controller 130 may receive a data signal from one or more of measurement devices 110. The data signal may include a data measurement (e.g., a numerical data value) from the associated measurement device. In some embodiments, the data signal may further include a time value at which the measured data value was obtained.

HVAC controller 130 may filter the data signal to reduce the effects of process noise and measurement noise on the measured value. HVAC controller 130 may determine an estimated state value (e.g., an estimate of the true data value without process and measurement noise) for the measured quantity. In some embodiments, HVAC controller 130 uses a Kalman filter to predict the estimated state value. In other embodiments, other types of filters may be used. HVAC controller 130 may determine whether a disturbance has occurred or determine a control action for one or more of control devices 120 based on the estimated state value. HVAC controller 130 is described in greater detail in reference to FIG. 3.

Still referring to FIG. 1, in some embodiments control system 100 further includes a supervisory controller 140. Supervisory controller 140 may receive a noisy data signal from one or more of measurement devices 110 and relay the signal to HVAC controller 130. HVAC controller 130 may process the signal and determine an estimated state value. The estimated state value may be communicated to supervisory controller 140. Supervisory controller 140 may determine whether a disturbance has occurred (e.g., by comparing the estimated value to a threshold) and/or determine high level control actions for one or more of control devices 120 based on the estimated state value.

Referring now to FIG. 2, system 100 is shown as a closed-loop control system, according to an exemplary embodiment. In the closed-loop control system 100, HVAC controller 130 is shown providing an input $u_{k-1}$ to a process system 150. Process system 150 is shown to include control device 120, system dynamics 150, and process noise $w_{k-1}$.

As described in reference to FIG. 1, control device 120 may be any device capable of controlling one or more of the variables measured by measurement device 110 (e.g., a chiller, boiler, AHU, power relay, flow controller, etc.). Input $u_{k-1}$ may be a setpoint for control device 120 (e.g., a power usage setpoint, a temperature setpoint, a damper position setpoint, etc.), a command to activate or deactivate a control device 120 within process system 150 (e.g., a command to turn off a power relay 128), or any other input provided to a controlled process system 150.

System dynamics 152 describe the response of process system 150 to a set of inputs $u_{k-1}$ and current system states $x_{k-1}$. System dynamics 152 may be of the form $Ax_{k-1}+Bu_{k-1}$ where the A and B coefficients describe characteristics of process system 150 (e.g., thermal capacitances, thermal resistances, electrical capacitances, electrical resistances, etc.). Process noise $w_{k-1}$ is the noise attributable to the process system 150. The outputs of system dynamics 152 and process noise $w_{k-1}$ are shown combining at summation block 155 to form a resultant system state $x_k$. System state $x_k$ may be expressed as $x_k = Ax_{k-1} + Bu_{k-1} + w_{k-1}$.

Still referring to FIG. 2, the closed-loop control system is further shown to include a measurement device 110 for measuring system state $x_k$. Measurement device 110 may add measurement noise $v_k$ to the measured system state $x_k$. System state $x_k$ and measurement noise $v_k$ are shown combining at summation block 115 to form a measurement $z_k$. Measurement $z_k$ may be expressed as $z_k = x_k + v_k$. HVAC controller 130 may receive measurement $z_k$ as a feedback signal from measurement device 110. Using feedback signal $z_k$, HVAC controller 130 performs closed-loop control over process system 150.

In an exemplary embodiment, HVAC controller 130 collects a plurality of measurements $z_k$ and calculates a deviation of the collected measurements. HVAC controller 130 may filter the noisy measurement signal provided by measurement device 110 and generate an input $u_{k-1}$ for process system 150. In some embodiments, HVAC controller 130 filters the noisy measurement signal using a filter with an adaptively adjusted covariance parameter (e.g., error covariance, process noise covariance, etc.). The covariance parameter may be increased when the calculated deviation in the noisy measurement signal exceeds a threshold value (e.g., a noise threshold). Increasing the covariance parameter may facilitate a quick response to a disturbance in the noisy measurement signal. HVAC controller 130 may determine an estimated state value for system state $x_k$ and determine $u_{k-1}$ based on the state estimation.

Figure 3:
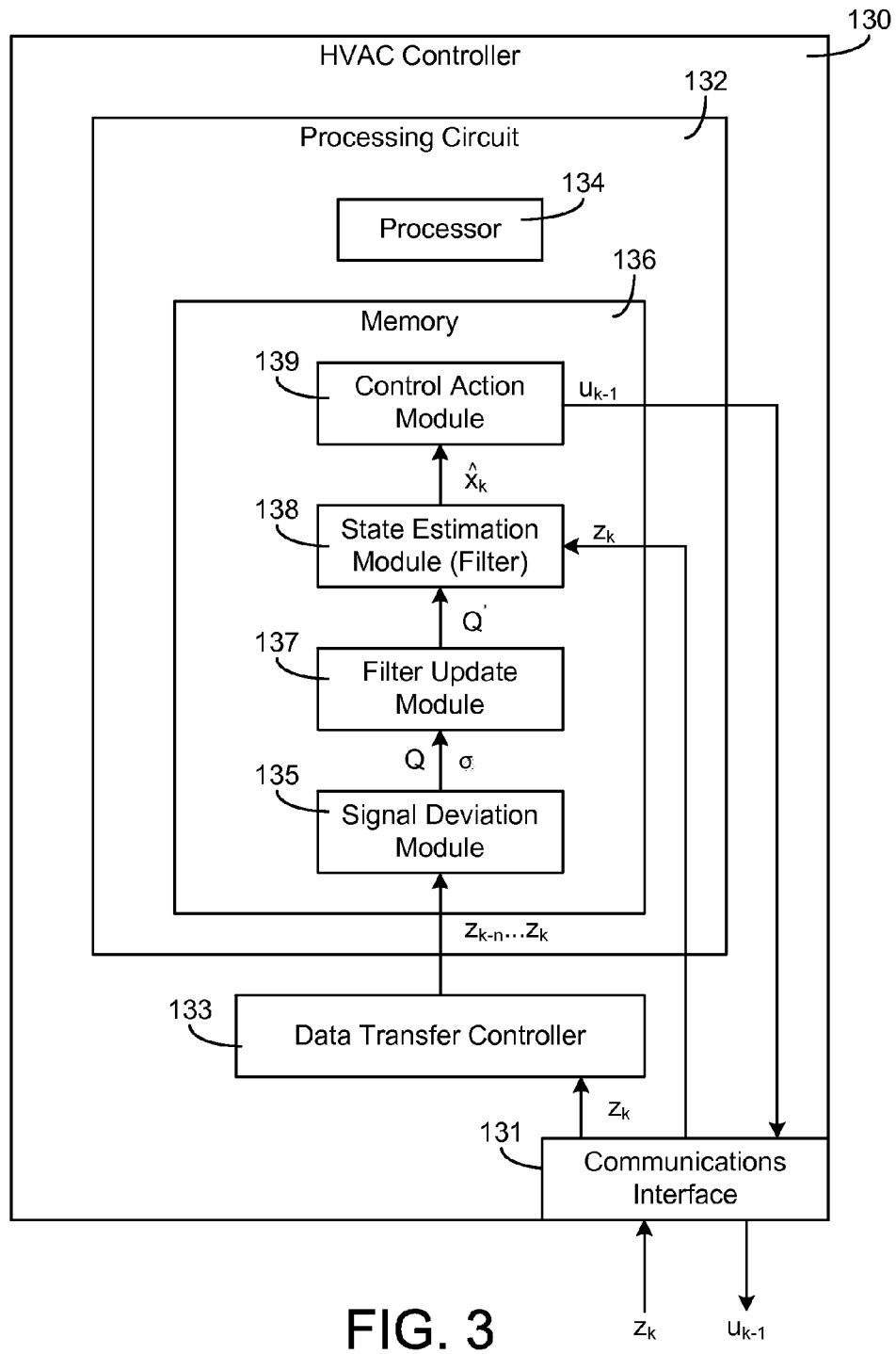
FIG. 3 is a block diagram of the HVAC controller of FIG. 1 shown in greater detail, according to an exemplary embodiment.

Referring now to FIG. 3, a detailed block diagram of HVAC controller 130 is shown, according to an exemplary embodiment. HVAC controller 130 is shown to include a communications interface 131, a data transfer controller 133, and a processing circuit 132.

Communications interface 131 can be or include wired or wireless interfaces (e.g., jacks, antennas, transmitters, receivers, transceivers, wire terminals, etc.) for conducting data communications with measurement device 110, control device 120, process system 150, supervisory controller 140, or other external sources via a direct connection or a network connection (e.g., an Internet connection, a LAN, WAN, or WLAN connection, etc.). For example, communications interface 131 can include an Ethernet card and port for sending and receiving data via an Ethernet-based communications link or network. In another example, communications interface 131 can include a WiFi transceiver for communicating via a wireless communications network. In another example, communications interface 131 may include cellular or mobile phone communications transceivers. Communications interface 131 may receive a feedback signal including one or more measurements $z_k$ from measurement device 110 and relay the feedback signal to data transfer controller 133.

Data transfer controller (DTC) 133 may receive the feedback signal from communications interface 131 and store (e.g., collect, record, archive, etc.) the one or more measurements $z_k$. Advantageously, DTC 133 may collect measurements $z_k$ passively (e.g., without involving processor 134), thereby freeing processor 134 to perform other data processing tasks. DTC 133 may be a data transfer controller as described in U.S. Pat. No. 6,202,154 to Suzuki et al., filed Apr. 16, 1998. In some embodiments, DTC 133 collects measurements $z_k$ until a threshold number of measurements have been collected (e.g., 2 measurements, 10 measurements, 20 measurements, 100 measurements, etc.). In other embodiments, DTC 133 collects measurements $z_k$ for a fixed time period (e.g., 10 milliseconds, 100 milliseconds, 500 milliseconds, etc.). Upon reaching a collection threshold (e.g., time or measurement quantity), the collected measurements may be transmitted from DTC 133 to processing circuit 134.

Processing circuit 133 is shown to include a processor 134 and memory 136. Processor 134 can be implemented as a general purpose processor, an application specific integrated circuit (ASIC), one or more field programmable gate arrays (FPGAs), a group of processing components, or other suitable electronic processing components. Memory 136 (e.g., memory device, memory unit, storage device, etc.) is one or more devices (e.g., RAM, ROM, Flash memory, hard disk storage, etc.) for storing data and/or computer code for completing or facilitating the various processes, layers and modules described in the present disclosure.

Memory 136 may be or include volatile memory or non-volatile memory. Memory 136 may include database components, object code components, script components, or any other type of information structure for supporting the various activities and information structures described in the present application. According to an exemplary embodiment, memory 136 is communicably connected to processor 134 via processing circuit 132 and includes computer code for executing (e.g., by processing circuit 132 and/or processor 134) one or more processes described herein. Memory 136 is shown to include a signal deviation module 135, a filter update module 137, a state estimation module 138 (e.g., a signal filter), and a control action module 139.

Signal deviation module 135 may calculate a deviation $\sigma$ in the measured values $z_k$. In some embodiments, the deviation $\sigma$ is a standard deviation of the collected measurements. For example, the deviation $\sigma$ may be calculated according to the formula $$\sigma = \sqrt{\frac{1}{n} \sum_{i=1}^{n} (z_i - \bar{z})^2}.$$

In other embodiments, the deviation $\sigma$ is a difference between two or more of the measured values $z_k$ (e.g., $\sigma = (z_k - z_{k-1})$) a difference between one of the measured values $z_k$ and a steady state value (e.g., $\sigma = (z_k - \bar{z})$), a difference between a measured value $z_k$ and a stored value (e.g., $\sigma = (z_k - N)$), or a variance of two or more of the measured values $z_k$. Signal deviation module 135 may calculate the deviation $\sigma$ in the measured values $z_k$ and communicate the deviation to filter update module 137.

Filter update module 137 may adaptively update a parameter (e.g., a process noise covariance, an error covariance, etc.) used by state estimation module 138 in determining an estimated state $\hat{x}_k$ for the measured variable. Filter update module 137 may compare the calculated deviation $\sigma$ with a noise threshold. The noise threshold may be a noise band around a steady-state value of the measured signal $z_k$. The steady-state value may be fixed (e.g., specified by a user, etc.) or adaptively determined based on a history of recent measurements obtained by measurement device 110. In some embodiments, the noise band has a static width (e.g., 0.3 V if the measurements are in units of volts, etc.) around the steady-state value. The width of the noise band may be specified by a user, retrieved from memory 136, or received from an automated signal noise estimation process. In some embodiments, the width of the noise band may be adaptively determined based on a history of recent measurements $z_k$ (e.g., using regression residuals and/or a first order infinite impulse filter). Advantageously, adaptively determining the noise threshold may provide flexibility to changes in the signal noise while accurately determining an appropriate value for the noise threshold.

In some embodiments, filter update module 137 sets a process noise covariance parameter Q used by state estimation module 138 based on whether the deviation σ determined by signal deviation module 135 exceeds the noise threshold. If the deviation σ exceeds the noise threshold, filter update module 137 may set the process noise covariance parameter Q to $Q_{high}$. If the deviation σ does not exceed the noise threshold, filter update module 137 may set the process noise covariance parameter Q to $Q_{low}$ leave the process noise covariance parameter Q unmodified. Advantageously, setting the process noise covariance parameter to $Q_{high}$ may increase the responsiveness of the filter used by state estimation module 138, thereby reducing filter lag and facilitating the detection of disturbances shortly after they occur. Setting the process noise covariance parameter to $Q_{low}$ result in a greater steady state signal noise reduction. Filter update module 137 may communicate the adaptively set process noise covariance Q' (e.g., $Q_{high}$ or $Q_{low}$) to state estimation module 138.

Still referring to FIG. 3, state estimation module 138 may filter the measured signal $z_k$ and determine an estimated state $\hat{x}_k$ for the measured variable. The hat notation indicates that the predicted state $\hat{x}_k$ is an estimate of the actual state $x_k$. In some embodiments, state estimation module 138 filters the measured signal $z_k$ and determines the estimated state $\hat{x}_k$ using a discrete Kalman filter. The Kalman filter can address the problem of trying to estimate a state $x_k$ for a discrete-time controlled process that is governed by the linear stochastic difference equation $x_k = Ax_{k-1} + Bu_{k-1} + w_{k-1}$ with a measurement $z_k = x_k + v_k$. The matrix A relates the state at the previous time step k−1 (e.g., $x_{k-1}$) to the state at the current time step k (e.g., $x_k$). The matrix B relates the optional control input $u_{k-1}$ to the state $x_k$. The random variables $w_{k-1}$ and $v_k$ represent the process noise and measurement noise respectively as described in reference to FIG. 2. The process noise $w_{k-1}$ has a defined process noise covariance Q and the measurement noise $v_k$ has a defined measurement noise covariance value R.

The Kalman filter defines a priori and a posteriori estimate errors as $e_k^- = x_k - \hat{x}_k^-$ and $e_k = x_k - \hat{x}_k$ respectively. The "super minus" notation (e.g., $e_k^-$, $\hat{x}_k^-$ etc.) signifies an estimate of a state or value at time step k given information known prior to time step k. Therefore, the equation $e_k^- = x_k - \hat{x}_k^-$ reads "the a priori error estimate is the difference between the true value of x at time step k and the estimated value of x at time step k given the information known prior to time step k." The a priori estimate error covariance and a posteriori estimate error covariance can be expressed as $P_k^- = e_k^- e_k^{-T}$ and $P_k = e_k e_k^T$ respectively.

State estimation module 138 may estimate the state $\hat{x}_k$ using a two step process. The first step of the two step process includes predicting an a priori state estimate $\hat{x}_k^-$ and an a priori estimate error covariance $P_k^-$ using information known prior to time step k (e.g., previous measurements, previously determined state values, etc.). In some embodiments, state estimation module 138 may use a previously estimated state value (e.g., for time step k−1) as the best a priori estimate of the state value at time step k. In other words, $\hat{x}_k^- = \hat{x}_{k-1}$. State estimation module 138 may predict the a priori estimate error covariance using the equation $P_k^- = P_{k-1} + Q$ where $P_{k-1}$ is a previously estimated estimate error covariance for time step k−1 and Q is a process noise covariance determined by signal deviation module 135.

The second step of the two step process includes updating the a priori estimates, taking into account a new data measurement $z_k$. The second step may involve computing the Kalman gain $G_k$ using the equation $$G_k = \frac{P_k^-}{P_k^- + R},$$

where R is the measurement noise covariance. The value of R may be specified by a user, retrieved from memory 136, or received from an automated measurement noise estimation process. Once the Kalman gain $G_k$ has been determined, the state estimate may be updated using the equation $\hat{x}_k = \hat{x}_k^- + G_k(z_k - \hat{x}_k^-)$. The estimate error covariance $P_k$ may be updated using the equation $P_k = (1 - G_k)P_k^-$. The estimated state value $\hat{x}_k$ may be reported to another controller (e.g., supervisory controller 140, a parallel HVAC controller, a subordinate controller, etc.) or used by HVAC controller 130. HVAC controller 130 may use the estimated state value $\hat{x}_k$ to determine whether a disturbance has occurred and/or determine appropriate control actions for the HVAC system.

Still referring to FIG. 3, HVAC controller 130 is shown to include a control action module 139. Control action module 139 may receive the estimated state value $z_k$ from state estimation module 138. In some embodiments, control action module 139 uses the estimated state value $\hat{x}_k$ to determine whether a disturbance has occurred. For example, control action module 139 may compare the estimated state value $\hat{x}_k$ to a disturbance threshold. If the estimated state value $\hat{x}_k$ is less than the disturbance threshold, control action module 139 may determine that a disturbance has occurred. In other embodiments, control action module 139 may determine that a disturbance has occurred if the estimated state value $\hat{x}_k$ meets or exceeds the disturbance threshold. In further embodiments, control action module 139 may determine that a disturbance has occurred based on a calculated rate of change in the estimated state value $\hat{x}_k$ $$\left(\text{e.g.,} \frac{\hat{x}_k - \hat{x}_{k-1}}{t_k - t_{k-1}}, \frac{d\hat{x}}{dt}, etc\right).$$

In some embodiments, the disturbance threshold is a multi-tiered threshold having two or more different threshold values. For example, the measured variable $z_k$ may be voltage measurement and the estimated state value $\hat{x}_k$ may be an estimated voltage value for a power supply line. The disturbance threshold may include a "brownout voltage" threshold and a "blackout voltage" threshold. The brownout voltage threshold may indicate that the supply line voltage is approaching a dangerously low value. Any further decrease in the supply line voltage below the brownout voltage threshold could result in an insufficient amount of power being supplied to connected HVAC equipment (e.g., a compressor, AHU, chiller, etc.). If the estimated voltage state $\hat{x}_k$ is less than the brownout voltage threshold, control action module 139 may determine that the system is in a brownout state.

The blackout voltage threshold may be lower than the brownout voltage threshold. The blackout voltage threshold may indicate that the supply line voltage is at a dangerously low level. If the supply line voltage is less than the blackout voltage, connected HVAC equipment may begin to turn on and off intermittently (e.g., "chatter"), thereby increasing the potential for damage to the equipment. If the estimated voltage state $\hat{x}_k$ is less than the blackout voltage threshold, control action module 139 may determine that the system is in a blackout state.

In some embodiments, control action module 139 may determine a control action for one or more of control devices 120 based on the estimated state value $\hat{x}_k$. The control action may include modifying a setpoint for a control device 120, activating or deactivating a control device 120, or taking other corrective action to account for a disturbance. For example, if the measured variable $z_k$ is a supply line voltage and control action module 139 determines that the system is in a brownout state (e.g., the estimated supply line voltage is less than the brownout voltage threshold), the control action may include preventing currently inactive power relays 128 from turning on. By preventing currently inactive power relays from activating, HVAC controller 130 can ensure that the supply line voltage will not drop further (e.g., below the blackout voltage threshold). If control action module 139 determines that the system is in a blackout state (e.g., the estimated supply line voltage is less than the blackout voltage threshold), the control action may include deactivating one or more currently active power relays.

Figure 4:
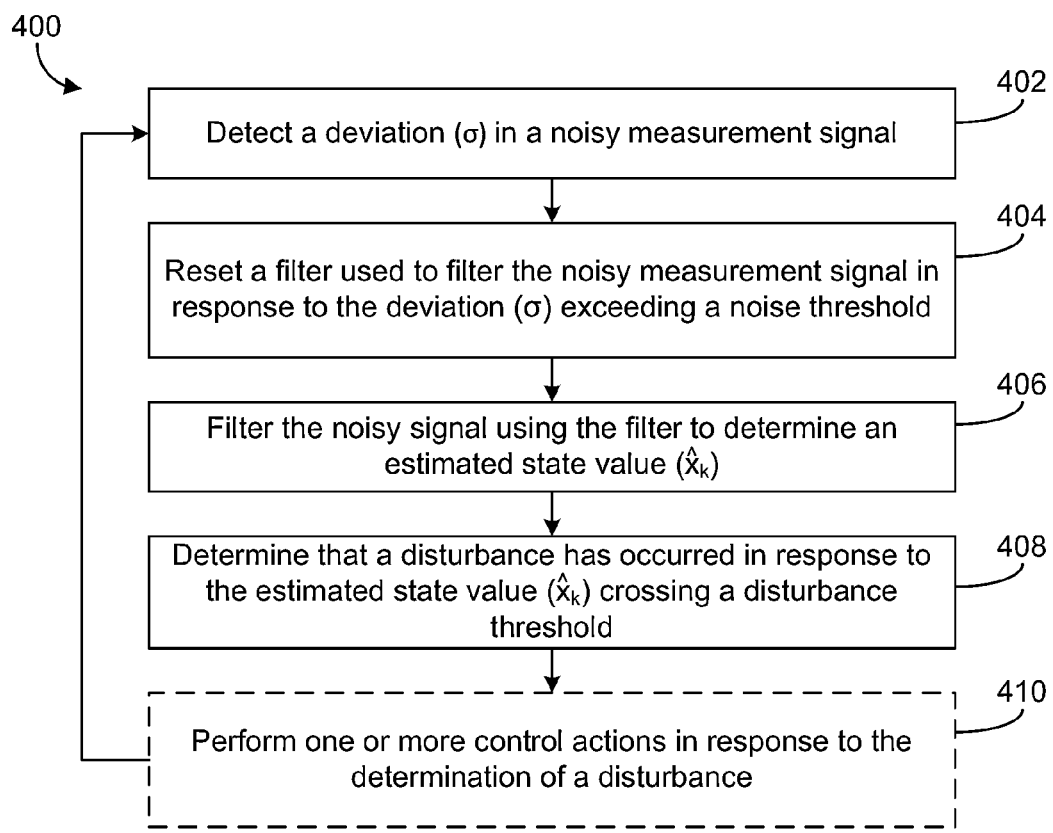
FIG. 4 is a flowchart of a process for detecting and responding to disturbances in a HVAC system, according to an exemplary embodiment.

Referring now to FIG. 4, a flowchart of a process 400 for detecting and responding to disturbances in a HVAC system is shown, according to an exemplary embodiment. Process 400 may be performed by HVAC controller 130, supervisory controller 140, and/or various components thereof (e.g., signal deviation module 135, state estimation module 138, control action module 139, etc.).

Process 400 is shown to include detecting a deviation σ in a noisy measurement signal (step 402). The noisy signal may include one or more measured values $z_k$ of the form $z_k = x_k + v_k$, where $x_k = Ax_{k-1} + Bu_{k-1} + w_{k-1}$ and where $w_{k-1}$ and $v_k$ are process noise and signal noise respectively. In some embodiments, the noisy signal may include a measurement value $z_k$ and a time value $t_k$. Measurement value $z_k$ may be a numerical representation of a measured state or condition. Time value $t_k$ may be a time at which the measurement value $z_k$ was recorded. The noisy signal may be received from any of measurement devices 110, control devices 120, or any other HVAC device. The noisy signal may be received directly from a measurement device (e.g., a temperature sensor, pressure sensor, etc.) or indirectly from an intermediate signal relay, a supervisory controller, or a subordinate controller (e.g., a device-specific controller, a local controller, etc.).

Step 402 may involve collecting one or more measurements $z_k$ and calculating a deviation σ. In some embodiments, the measurements $z_k$ are collected passively using a data transfer controller. In some embodiments, the deviation σ is a standard deviation of the collected measurements $z_{k-n} \ldots z_k$. In other embodiments, the deviation σ is a difference between two or more of the measured values $z_k$ (e.g., $\sigma = (z_k - z_{k-1})$) a difference between one of the measured values $z_k$ and a steady state value (e.g., $\sigma = (z_k - \bar{z})$), a difference between a measured value $z_k$ and a stored value (e.g., $\sigma = (z_k - n)$), or a variance of two or more of the measured values $z_k$.

Process 400 is further shown to include resetting a filter used to filter the noisy measurement signal in response to the deviation σ exceeding a noise threshold (step 404). In some embodiments, step 404 includes comparing the calculated deviation σ to a noise threshold. If the calculated deviation σ exceeds the noise threshold, the filter is "reset" (e.g., by increasing a process noise covariance parameter Q). If the calculated standard deviation σ does not exceed the noise threshold, the process noise covariance parameter Q is set to a lower value or left unmodified from an initial value. Advantageously, such adaptive increasing of the process noise covariance parameter Q may increase the responsiveness of the filter to disturbances in the measured signal in the presence of noisy measurements. The increased responsiveness of the filter may cause the estimated state $\hat{x}_k$ to accurately and responsively track the actual state value $x_k$, thereby enabling disturbances to be detected shortly after they occur, even in the presence of measurement noise.

Process 400 is further shown to include filtering the noisy signal using the filter to determine an estimated state value $\hat{x}_k$ (step 406). The estimated state value $\hat{x}_k$ may be an estimate of the actual state value $x_k$ at a given time step k. Step 406 may involve processing the noisy signal using any number of signal processing techniques to reduce measurement noise $v_k$, predict an estimated state value (e.g., a present state value $\hat{x}_k$, a past state value $\hat{x}_{k-n}$, a future state value $\hat{x}_{k+n}$), or prepare the signal for use in a feedback control system (e.g., HVAC control system 100). In some embodiments, the filter is a discrete Kalman filter. In other embodiments, the filter may be a high-pass filter, a band-pass filter, a Bessel filter, or any other filter for reducing or removing noise in the measured signal. The estimated state value $\hat{x}_k$ may be communicated to another controller (e.g., a supervisory controller, a device controller, etc.) and/or used to determine appropriate control actions for a controlled process system.

Process 400 is further shown to include determining that a disturbance has occurred in response to the estimated state value $\hat{x}_k$ crossing a disturbance threshold (step 408). In some embodiments, the disturbance threshold is a lower threshold for the estimated state value $\hat{x}_k$. In such embodiments, it may be determined that the estimated state value $\hat{x}_k$ has crossed the disturbance threshold if the value of $\hat{x}_k$ is less than the lower threshold. In other embodiments, the disturbance threshold is an upper threshold for the estimated state value $\hat{x}_k$. In such embodiments, it may be determined that the estimated state value $\hat{x}_k$ has crossed the disturbance threshold if the value of $\hat{x}_k$ is greater than the upper threshold. In further embodiments, the disturbance threshold is a multi-tiered threshold having two or more threshold values. In such embodiments, step 408 may involve determining that a specific type of disturbance has occurred. The specific type of disturbance determined by step 408 may be based on which of the multiple thresholds that the estimated state value $\hat{x}_k$ crosses.

In some embodiments, process 400 may further include performing one or more control actions in response to the disturbance (step 410). The control actions may be based on a type of disturbance determined in step 408, a magnitude of the disturbance (e.g., an amount by which the estimated state value $\hat{x}_k$ exceeds the threshold, a difference between $\hat{x}_k$ and the threshold, etc.), and/or the options available for interacting with the controlled system. In some embodiments, step 410 may involve modifying a setpoint or input to a controlled process system, activating or deactivating a device of the process system, or taking other corrective action to account for a disturbance. In other embodiments, step 410 may involve communicating the estimated state value $\hat{x}_k$ to a separate controller (e.g., supervisory controller 410, a local device controller, etc.) for use in determining appropriate control actions for a controlled process system.

Figure 5:
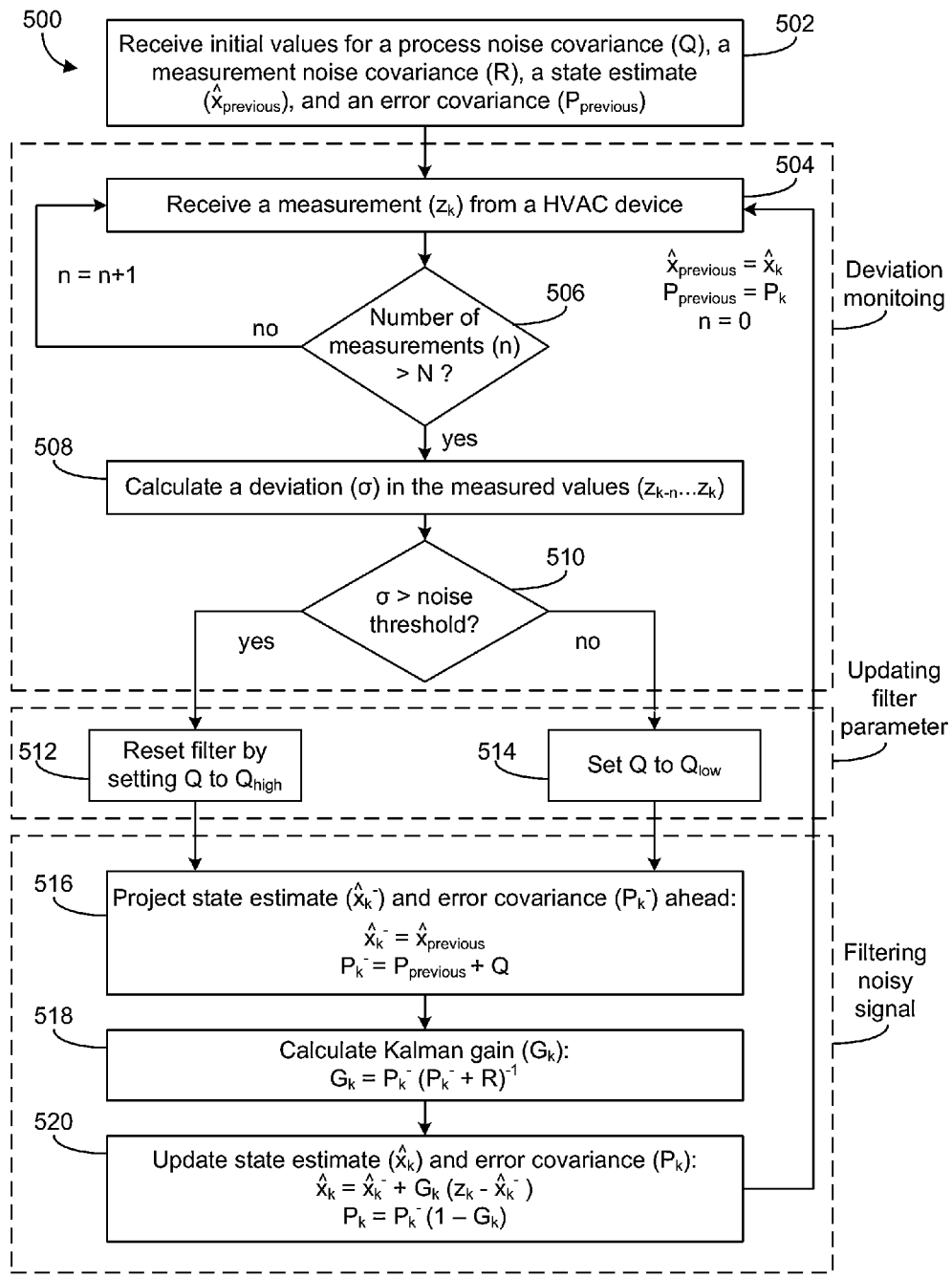
FIG. 5 is a flowchart of a process for determining an estimated system state by filtering a noisy measurement signal using the systems and methods of the present disclosure, according to an exemplary embodiment.

Referring now to FIG. 5, a flowchart of a process 500 for determining an estimated state value $\hat{x}_k$ using a Kalman filter is shown, according to an exemplary embodiment. Process 500 is a specific implementation of process 400 and may be used to accomplish some or all of steps 402-406. For example, steps 504, 506, 508, and 510 may be used to detect a deviation in a noisy measurement signal (step 402). Steps 512, and 514 may be used to reset a filter (e.g., update a filter parameter) used to filter the noisy measurement signal (step 404). Steps 516, 518, and 520 may be used to filter the noisy signal to determine an estimated state value $\hat{x}_k$ (step 406). Process 500 may be performed by HVAC controller 130 using signal deviation module 135 and/or state estimation module 138.

Process 500 is shown to include receiving initial values for a process noise covariance Q, a measurement noise covariance R, a state estimate $\hat{x}_{previous}$, and an error covariance $P_{previous}$ (step 502). In some embodiments, initial values for such quantities may be specified by a user (e.g., received as user input via a user input device). An initial value for the process noise covariance Q may be selected to minimize the effect of noise in the measured signal. In some embodiments, an initial value of Q may be selected assuming that the measured signal is at steady state (e.g., demonstrating minimal process noise covariance). In some embodiments, some or all of the quantities may be calculated based on measurements obtained from a measurement device or received from another process or system. For example, the measurement noise covariance R may be calculated using a plurality of measurements of a steady-state signal recorded by a single measurement device.

Process 500 is further shown to include receiving a measurement $z_k$ from a HVAC device (step 504). $z_k$ may be of the form $z_k = x_k + v_k$, where $x_k = Ax_{k-1} + Bu_{k-1} + w_{k-1}$ and where $w_{k-1}$ and $v_k$ are process noise and signal noise respectively. The HVAC device may be a chiller, a boiler, an air handling unit, a flow controller, a field controller, a supervisory controller, an actuator, a signal relay, a temperature sensor, a pressure sensor, a voltage sensor, or any other measurement device. The measured values $z_k$ may be temperature measurements, pressure measurements, voltage measurements, flow rate measurements, power usage measurements, or measurements relating to any other condition or state of a HVAC system. In some embodiments, the measurement $z_k$ may include a measurement value and a time value. Advantageously, measurements $z_k$ may be received passively (e.g., without the active involvement of a data processor), thereby freeing the processor to perform other data processing tasks. For example, a data transfer controller (DTC) may be used to collect measurements $z_k$.

Process 500 is further shown to include checking whether the number of measurements n received during step 504 exceeds a threshold number of measurements N (step 506). If the number of measurements received n does not exceed the threshold number of measurements N, process 500 may involve repeating step 504 until the threshold number of measurements N have been received. Waiting until a threshold number of measurements N have been received may reduce the computational load (e.g., computation time, processing resources, processing power, etc.) required to perform process 500. Additionally, waiting until a threshold number of measurements N have been received may provide an initial amount of pre-filtering or noise reduction for embodiments in which an average measurement (e.g., an average value of the measurements received up to the threshold number) is used in subsequent steps of process 500.

Once the number of measurements received n exceeds the threshold number N, process 500 is shown to include calculating a deviation σ in the measured values $z_{k-n} \ldots z_k$ (step 508) and comparing the deviation σ to a noise threshold (step 510). In some embodiments, the deviation σ is a standard deviation of the collected measurements $z_{k-n} \ldots z_k$. In other embodiments, the deviation σ is a difference between two or more of the measured values, a difference between one of the measured values $z_k$ and a steady state value, a difference between a measured value $z_k$ and a stored value, or a variance of the collected measurements $z_{k-n} \ldots z_k$. The noise threshold may be a noise band, an upper noise threshold, a lower noise threshold, or any other threshold value. The noise threshold may be received from a user, calculated based on measured values (e.g., steady state signal noise measurements, etc.) or received from another process or system.

If the calculated deviation σ exceeds the noise threshold, process 500 is shown to include resetting the filter by setting the process noise covariance Q to a high process noise covariance value $Q_{high}$ (step 512). Advantageously, the higher process noise covariance $Q_{high}$ may cause the filter to assign a lesser weight to previous data values, thereby increasing the responsiveness of the filter to disturbances. The increased responsiveness of the filter may allow the estimated state $\hat{x}_k$ to accurately and responsively track the actual state value $x_k$, thereby enabling disturbances to be detected shortly after they occur. If the calculated deviation σ does not exceed the noise threshold, process 500 is shown to include setting the process noise covariance Q to a low process noise covariance value $Q_{low}$ (step 514). The lower process noise covariance value $Q_{low}$ allow the filter to significantly reduce the noise in the measured signal by assigning a higher weight to previous data values. A graph 605 illustrating the advantages of adaptively resetting the Kalman filter (e.g., by adjusting the process noise covariance Q) is shown in FIG. 6B.

Process 500 is further shown to include projecting the state estimate $\hat{x}_k^-$ and error covariance $P_k^-$ ahead (step 516). Step 516 involves determining a priori estimates for the estimated state value $\hat{x}_k$ and the error covariance $P_k$. In some embodiments, the a priori state estimate $\hat{x}_k^-$ may be calculated using the equation $\hat{x}_k^- = A\hat{x}_{k-1} + Bu_{k-1}$. The matrix A relates the state estimate at the previous time step k−1 (e.g., $\hat{x}_{k-1}$) to the state estimate at the current time step k (e.g., $\hat{x}_k^-$). The where the matrix B relates the optional control input $u_{k-1}$ to the state estimate $\hat{x}_k$. In other embodiments, a priori state estimate $\hat{x}_k^-$ may be calculated using the equation $\hat{x}_k^- = \hat{x}_{previous}$, where the previous state estimate $\hat{x}_{previous}$ is used as the best a priori estimate of the current state. The a priori error covariance $P_k^-$ may be calculated using the equation $P_k^- = P_{previous} + Q$ where $P_{previous}$ is the initial error covariance received in step 502 and Q is either $Q_{high}$ or $Q_{low}$ as determined in steps 510-514.

Process 500 is further shown to include calculating the Kalman gain $G_k$ (step 518) and updating the estimated state value $\hat{x}_k$ and the error covariance $P_k$ (step 520). The Kalman gain $G_k$ may be calculated using the equation $$G_k = \frac{P_k^-}{P_k^- + R},$$

where R is the measurement noise covariance received in step 502 and $P_k^-$ is the a priori estimate for the error covariance as determined in step 416. Once the Kalman Gain $G_k$ has been calculated, the estimated state value $\hat{x}_k$ be using the equation $\hat{x}_k = G_k(z_k - \hat{x}_k^-)$. The error covariance $P_k$ may be updated using the equation $P_k = (1 - G_k)P_k^-$.

Process 500 may be preformed iteratively by repeating steps 504-520. The values of $\hat{x}_k$ and $P_k$ as determined in step 520 may be used as initial values for $\hat{x}_{previous}$ and $P_{previous}$ in subsequent iterations.

Figure 6A:
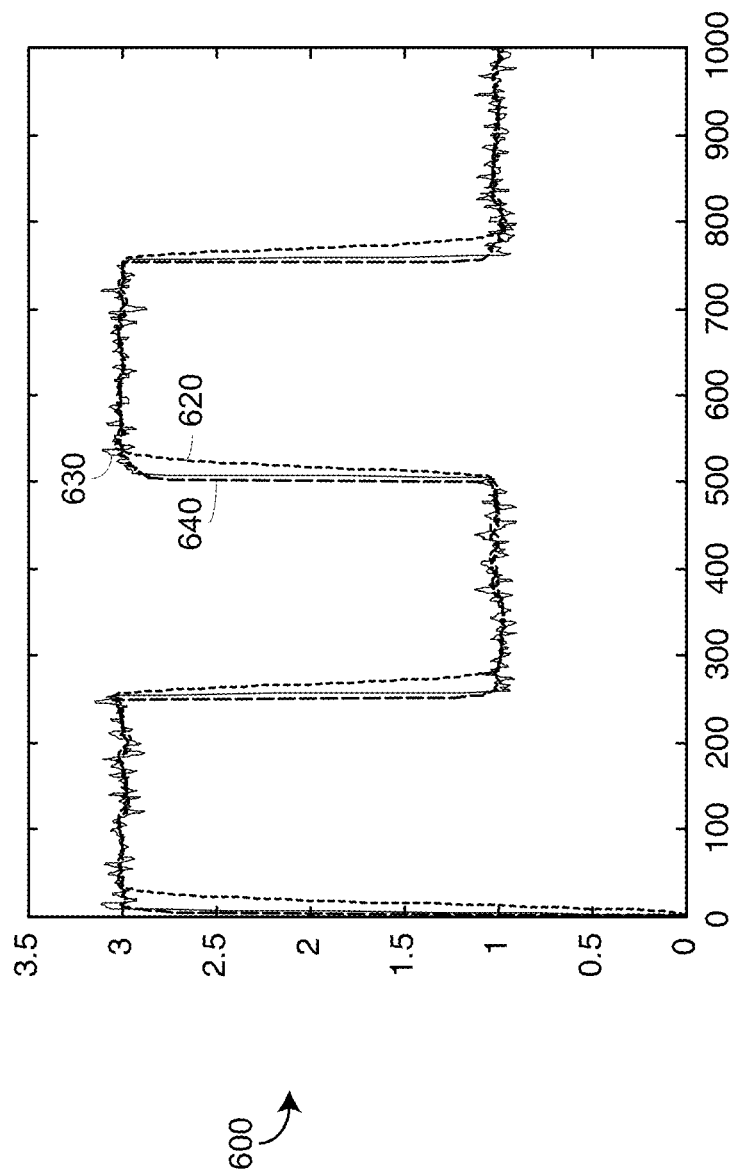
FIG. 6A is a graph illustrating the expected performance of the systems and methods described herein contrasted with traditional noise reduction and filtering techniques, demonstrating an increased responsiveness to a disturbance in the system while adequately filtering noise in the noisy measurement signal, according to an exemplary embodiment.
Figure 6B:
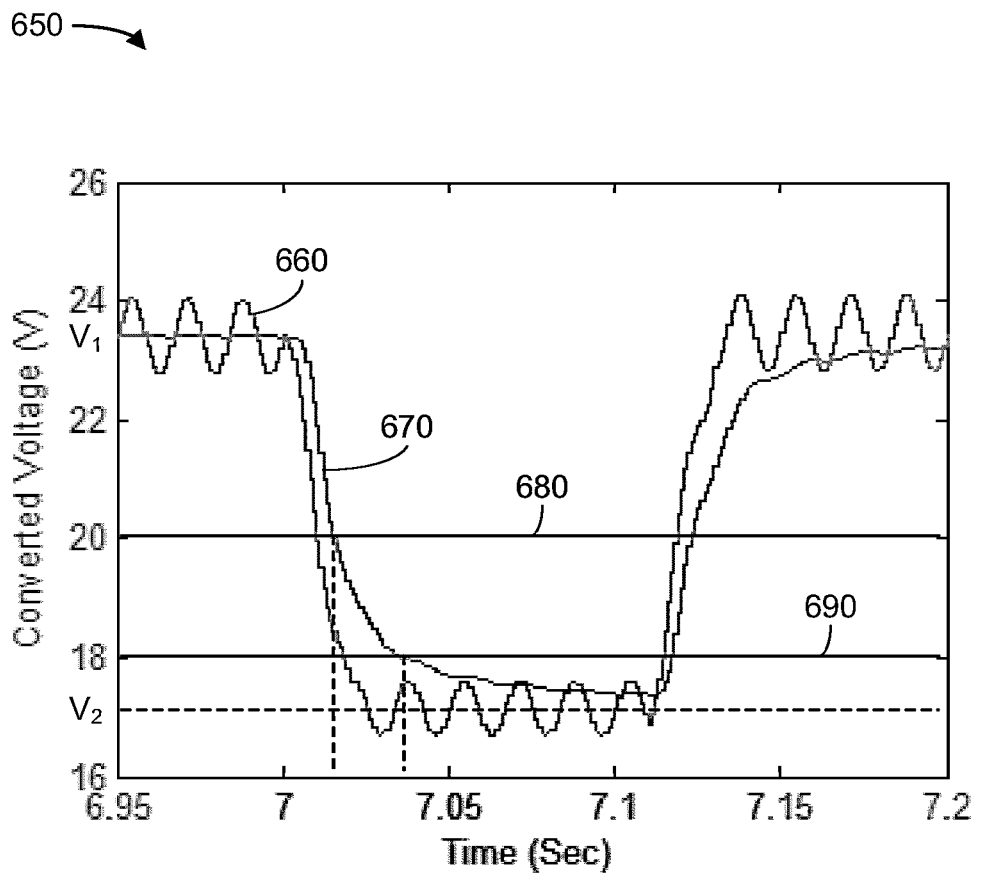
FIG. 6B is a graph illustrating the expected responsiveness of the systems and methods described herein to a disturbance in a measured voltage signal, demonstrating a brownout voltage detection within one line cycle of the disturbance and a blackout voltage detection within three line cycles of the disturbance, according to an exemplary embodiment.

Referring now to FIG. 6A, a graph 600 illustrating the expected performance of several filtering techniques is shown, according to an exemplary embodiment. Graph 600 illustrates the estimated state values $\hat{x}_k$ which result from filtering a noisy measurement signal using three different noise reduction filters. Lines 620 and 630 show the expected result of filtering the noisy measurement signal using a filter (e.g., a low-pass Bessel filter, a Kalman filter, etc.) with a static covariance parameter (e.g., process noise covariance, error covariance, etc.). Line 640 shows the expected result of filtering the noisy measurement signal using a filter with an adaptively adjusted covariance parameter.

Line 620 illustrates the expected performance of a first filter with a low and unchanging covariance parameter. The first filter effectively reduces the noise in the noisy measurement signal. However, line 620 lags the unfiltered measurement signal upon the occurrence of a disturbance. This delay makes a filter with a low and unchanging covariance parameter unsuitable for rapid disturbance detection and response.

Line 630 illustrates the expected performance of a second filter with a high and unchanging covariance parameter. The second filter demonstrates a much quicker response to a disturbance when compared with line 620. However, the higher covariance parameter has the undesirable effect of reducing the noise suppression achieved by the second filter. For example, line 630 is shown having more noise than line 620. This inadequate noise suppression renders a filter with a high and unchanging covariance parameter unsuitable for accurate state estimation and response.

Still referring to FIG. 6A, line 640 shows the expected performance of filtering the noisy measurement signal using a third filter (e.g., a Kalman filter, a Bessel filter, etc.) with an adaptively adjusted covariance parameter. The covariance parameter may be an error covariance parameter $P_k$ or a process noise covariance parameter Q, as described in reference to FIG. 5. The third filter (e.g., line 640) demonstrates superior noise reduction when compared with the second filter (e.g., line 630). The third filter also demonstrates a faster response to a disturbance in the noisy measurement signal when compared with the first filter (e.g., line 620). Adaptively adjusting the covariance parameter allows the third filter to adequately reduce noise in the unfiltered signal while enabling rapid disturbance detection and response.

Referring now to FIG. 6B, a graph 650 illustrating the expected responsiveness of the systems and methods described herein is shown, according to an exemplary embodiment. Graph 650 is shown to include an AC voltage signal 660, an estimated state voltage 670, a brownout voltage threshold 680, and a blackout voltage threshold 690. Signal 660 may be a measured signal received from a measurement device (e.g., voltage sensor 118, etc.) or calculated based on a measured signal (e.g., calculated from an electric current measurement, a power usage measurement, etc.). Signal 660 may have an oscillatory period defining a line cycle. Graph 650 shows signal 660 as having a 60 Hz oscillatory frequency and an oscillatory period of approximately 16.7 milliseconds. However, in other embodiments, signal 660 may have any oscillatory period and/or oscillatory frequency.

Signal 660 is shown having an initial mean voltage $V_1$ (e.g., approximately 23.5 V) greater than both brownout voltage threshold 680 and blackout voltage threshold 690. At t=7 seconds, the mean voltage of signal 660 is shown dropping to $V_2$ (e.g., approximately 17 V) due to a disturbance in the system. Estimated state voltage 670 quickly responds to the disturbance. Within one line cycle of the disturbance occurring (e.g., approximately 16.7 ms) estimated state voltage 670 has dropped below brownout voltage threshold 680. Within three line cycles of the disturbance occurring (e.g., approximately 50 ms), estimated state voltage 670 has dropped below blackout voltage threshold 690. The rapid response of estimated state voltage 670 to a disturbance in the system (e.g., a brownout state, blackout state, etc.) allows for disturbances to be detected shortly after they occur (e.g., within 50 ms). Quickly detecting disturbances consequently allows for immediate and effective control actions to be taken (e.g., deactivating a power relay, modifying a setpoint, etc.) in response to the disturbance.

Figure 7:
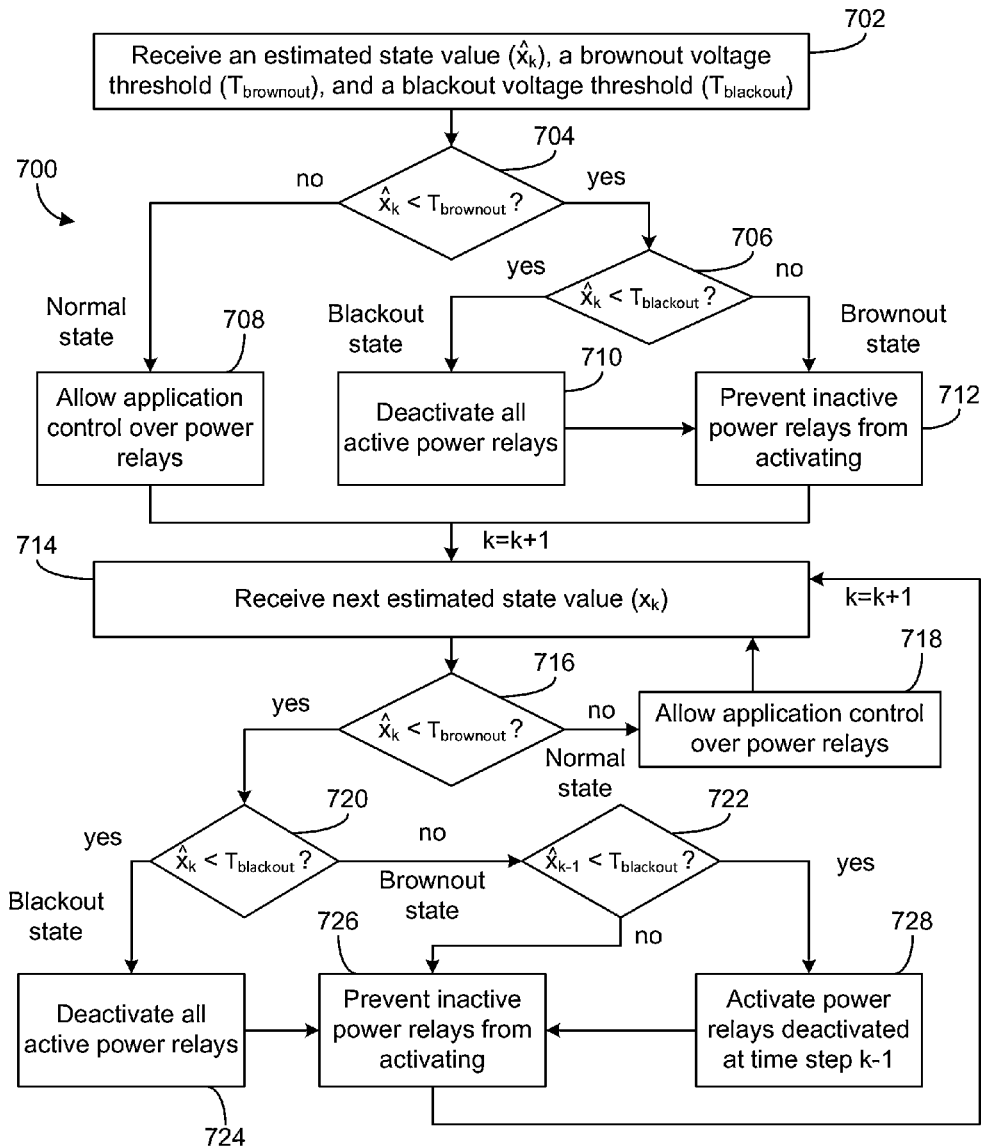
FIG. 7 is a flowchart of a process for determining whether a HVAC system is in a normal state, a brownout state, or a blackout state and for initiating one or more control actions based on the determined system state, according to an exemplary embodiment.

Referring now to FIG. 7, a flowchart of a process 700 for identifying and responding to a disturbance is shown, according to an exemplary embodiment. Process 700 is a specific application of process 400 in which the measured variable $z_k$ is a voltage measurement and the estimated state value $\hat{x}_k$ is an estimated voltage. Process 700 may be used to accomplish some or all of steps 408-410 (e.g., determining that a disturbance has occurred, performing one or more control actions in response to the disturbance, etc.).

In process 700, the controlled HVAC devices include one or more power relays. When a power relay is active, HVAC equipment connected to the power relay may draw power from a power supply line. A common problem in HVAC systems is that aging or damaged components (e.g., contactors in a compressor unit) can cause the supply line voltage to decrease or "sag." If the supply line voltage drops below a minimum necessary value, the HVAC equipment may begin to turn on and off intermittently (e.g., "chatter"). This behavior can cause damage to HVAC equipment and therefore should be prevented from occurring.

One way to prevent chattering is to prevent the supply line voltage from dropping below the minimum necessary value. A sufficient voltage may be maintained by preventing currently inactive equipment from activating, thereby limiting the required power load and preventing further "sag" in the supply line voltage. Another way to prevent chattering is by deactivating HVAC equipment to which an insufficient voltage is being supplied. Deactivating such equipment may prevent the equipment from attempting to turn on, thereby avoiding the rapid on-off cycling. Process 700 illustrates an exemplary process for detecting a disturbance in the power supply line (e.g., a voltage drop) and performing one or more control actions in response to the disturbance.

Process 700 is shown to include receiving an estimated state value $\hat{x}_k$, a brownout voltage threshold $T_{brownout}$, and a blackout voltage threshold $T_{blackout}$ (step 702). The estimated state value $\hat{x}_k$ may be an estimated voltage value for a power supply line. The value of $\hat{x}_k$ may be determined using process 500 or any other state estimation process. $T_{brownout}$ may be a supply line voltage threshold indicating a dangerously low supply line voltage. A supply line voltage below $T_{brownout}$ may be sufficient to power any active HVAC equipment; however, any further decrease in the supply line voltage may result in power loss and/or "chattering" equipment. $T_{blackout}$ may be lower than $T_{brownout}$. $T_{blackout}$ may be a supply line voltage at which connected HVAC equipment will lose power (e.g., and begin to "chatter"). $T_{blackout}$ may be a minimum necessary voltage to sustain normal operation of connected HVAC equipment. Process 700 may use both voltage thresholds (i.e., $T_{brownout}$ and $T_{blackout}$) in determining appropriate control actions for connected HVAC equipment.

Process 700 is further shown to include comparing the estimated state value $\hat{x}_k$ with the brownout voltage threshold $T_{brownout}$ (step 704). If $\hat{x}_k$ is not less than $T_{brownout}$, it may be concluded that the system is in a "normal" state. In the normal state, process 700 is shown to include allowing application control over power relays (step 708). Allowing application control over power relays may allow the power relays to be activated or deactivated based on current power usage requirements of the HVAC system. Activating a power relay (e.g., upon an activation command from an application) may cause the supply line voltage to decrease. However, in the normal state, the supply line voltage is not dangerously close to the minimum necessary voltage (e.g., $T_{blackout}$) to sustain normal operation of connected HVAC equipment. Thus, a small decrease in the supply line voltage (e.g., a voltage drop caused by activating a single power relay) may be tolerated without risking chatter.

Referring again to step 704, if $\hat{x}_k$ is less than $T_{brownout}$, process 700 may involve comparing $\hat{x}_k$ with $T_{blackout}$ (step 706). If $\hat{x}_k$ is less than $T_{blackout}$, it may be concluded that the system is in a "blackout" state. In the blackout state, process 700 is shown to include deactivating all active power relays (step 710) and preventing inactive power relays from activating (step 712). Deactivating active power relays may prevent the relays from attempting to operate with an insufficient supply line voltage, thereby preventing chatter from occurring. Preventing inactive power relays (e.g., including the power relays deactivated in step 710) from activating may ensure that no currently inactive relay attempts to turn on when the power supply line voltage is insufficient to support normal operation.

Referring again to step 706, if $\hat{x}_k$ is not less than $T_{blackout}$, it may be concluded that the system is in a "brownout" state (e.g., $T_{blackout} < \hat{x}_k < T_{brownout}$) In the brownout state, process 700 is shown to include preventing inactive power relays from activating (step 712). Currently active power relays may be allowed to continue operating because the power supply line voltage is not yet below a minimum acceptable voltage. However, inactive relays may be prevented from activating and causing the supply line voltage to decrease below $T_{blackout}$.

Once an appropriate control action has been taken, process 700 may include advancing to the next time step (e.g., k=k+1) and receiving the next estimated state value $\hat{x}_k$ (step 714). The next estimated state value may be compared with $T_{brownout}$ (step 716). If $\hat{x}_k$ is not less than $T_{brownout}$, it may be determined that the system is in the "normal" state and applications may be allowed to control relay operation (step 718). However, if $\hat{x}_k$ is less than $T_{brownout}$, $\hat{x}_k$ may be compared with $T_{blackout}$ (step 720). If $\hat{x}_k$ is less than $T_{blackout}$, it may be determined that the system is in the "blackout" state and all active power relays may be deactivated (step 724). Furthermore, in the blackout state, all inactive power relays may be prevented from activating (step 726).

Referring again to step 720, if $\hat{x}_k$ is not less than $T_{blackout}$, it may be determined that the system is in the "brownout" state. In the brownout state, process 700 may involve determining whether the system has recently transitioned into the brownout state from the blackout state (step 722). Step 722 is shown to include comparing a previous state estimate $\hat{x}_{k-1}$ with $T_{blackout}$. If $\hat{x}_{k-1}$ is less than $T_{blackout}$, it may be determined that the system has transitioned from the blackout state at time step k-1 to the brownout state at time step k. If the system has recently transitioned into the brownout state from the blackout state, process 700 may include re-activating the power relays which were deactivated during step 710 (e.g., upon previously entering the blackout state) (step 728). However, the power relays which remain inactive (e.g., the power relays which were inactive prior to time step k-1 may be prevented from activating (step 726), thereby preventing the system from re-reentering the blackout state.

Referring again to step 722, if $\hat{x}_{k-1}$ is not less than $T_{blackout}$, it may be determined that the system has not transitioned from the blackout state and any inactive power relays may be prevented from activating (step 726). Once an appropriate control action has been taken, process 700 may include advancing to the next time step (e.g., k=k+1) and receiving the next estimated state value $\hat{x}_k$ (step 714). Steps 714-728 may be repeated iteratively upon receiving a new estimated state value.

Figure 8:
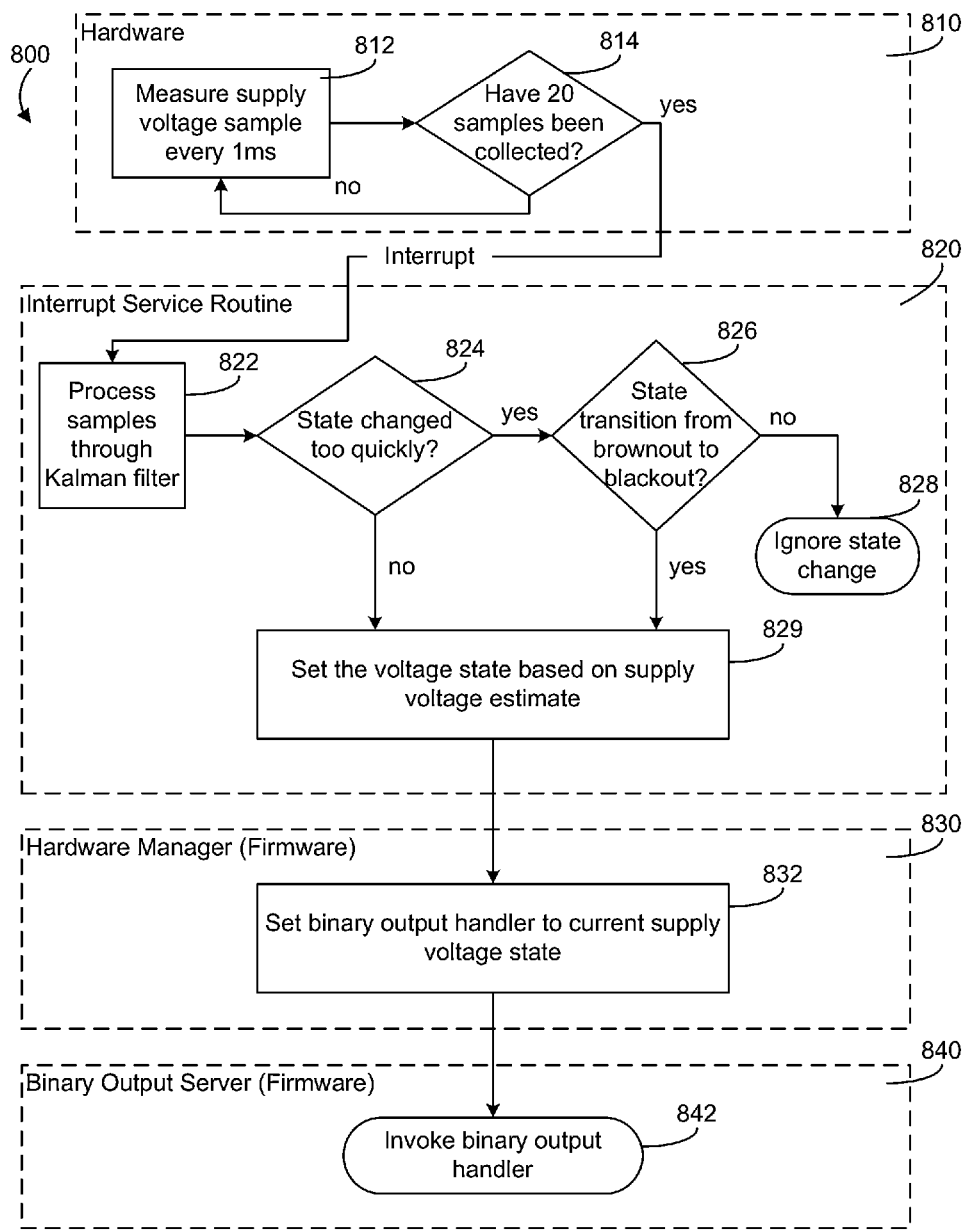
FIG. 8 is a flowchart of a process for sampling a noisy measurement signal, estimating a voltage state using the systems and methods described herein, and setting a hardware configuration based on the estimated voltage state, according to an exemplary embodiment.

Referring now to FIG. 8, a flowchart of a process 800 for determining a supply voltage state and initiating a responsive action is shown, according to an exemplary embodiment. Process 800 may be a specific implementation of process 400 and may include steps performed in both process 500 and process 700. Process 800 is shown having several sub-processes including a data collection sub-process 810, a signal filtering and state estimation sub-process 820, a hardware manager sub-process 830, and a binary output sub-process 840.

Data collection sub-process 810 is shown to include measuring a supply voltage sample every millisecond (step 812) and determining whether twenty samples have been collected (step 814). In some embodiments, steps 812 and 814 may be performed by a hardware device (e.g., a data transfer controller) without requiring active involvement of a data processor. The hardware device may collect measurements of the supply voltage upon a regular interval (e.g., every millisecond, every second, etc.) until a threshold number of measurements have been collected (e.g., twenty samples, fifty samples, etc.). Once the threshold number of measurement have been collected, an interrupt service routine (e.g., sub-process 820) may be performed on the collected measurements.

Signal filtering and state estimation sub-process 820 is shown to include processing the collected samples through a Kalman filter (step 822). Step 822 may be accomplished using one or more steps of process 500. For example, step 822 may include calculating a deviation σ in the measured values, resetting the filter in response to a deviation exceeding a noise threshold, determining a Kalman gain, and estimating a state value (e.g., a supply line voltage). The estimated supply line voltage $\hat{x}_k$ may be based on measurements collected in data collection sub-process 810 and/or the determined Kalman gain.

In some embodiments, sub-process 820 includes determining whether the estimated voltage state $\hat{x}_k$ has changed too quickly (step 824). Step 824 may be accomplished by calculating a rate of change between a current voltage state estimate $\hat{x}_k$ and a previous voltage state estimate $\hat{x}_{previous}$ $$\left(e.g., \frac{\hat{x}_k - \hat{x}_{previous}}{t_k - t_{previous}}\right).$$

If the calculated rate of change exceeds a rate threshold, it may be determined in step 824 that the estimated state has changed too quickly. If it is determined that the estimated state has changed too quickly, sub-process 820 may include determining whether the current state transition is from brownout to blackout (e.g. $T_{blackout} < \hat{x}_k < T_{brownout} \rightarrow \hat{x}_k < T_{blackout}$) (step 826). If the state transition is not from blackout to brownout and the state has changed too quickly, sub-process 820 is shown to involve ignoring the state change (step 828). Step 828 may involve terminating process 800 without performing sub-processes 830 or 840.

Referring again to steps 824 and 826, if it is determined that the estimated state has not changed too quickly (step 824) or that the state transition is from brownout to blackout (step 826), sub-process 820 may involve setting the voltage state (e.g., normal state, brownout state, blackout state) based on the supply voltage estimate $\hat{x}_k$ (step 829). For example, if $\hat{x}_k < T_{blackout}$, step 829 may involve setting a "blackout" voltage state. If $T_{blackout} < \hat{x}_k < T_{brownout}$, step 829 may involve setting a "brownout" voltage state. If $\hat{x}_k > T_{brownout}$, step 829 may involve setting a "normal" voltage state.

Hardware manager sub-process 830 is shown to include setting a binary output handler to the current supply voltage state (step 832). The binary output handler may be a value, a set of values, a vector, a table, or other data indicating currently active voltage states. In some embodiments, the binary output handler includes a first output (e.g., a "blackout state" binary output) indicating whether the "blackout" state is active and a second output (e.g., a "brownout state" binary output) indicating whether the "brownout" state is active. The binary outputs may be specified as true/false, on/off, zero/one, yes/no, or any other set of mutually exclusive outputs. For example, if the voltage state is set to the "blackout" voltage state (e.g., in step 829), step 832 may involve activating the "blackout state" binary output and deactivating the "brownout state" binary output. If voltage state is set to the "brownout" voltage state, step 832 may involve activating the "brownout state" binary output and deactivating the "blackout state" binary output. If voltage state is set to the "normal" voltage state, step 832 may involve deactivating both the "blackout state" binary output and the "brownout state" binary output.

Binary output sub-process 840 is shown to include invoking the binary output handler (step 842). Step 842 may involve performing one or more control actions in response to the binary outputs set during step 832. The control actions may be the same control actions performed in process 700. For example, control actions may include deactivating all active power relays (e.g., step 724), preventing inactive power relays from activating (e.g., step 726), activating previously deactivated power relays (e.g., step 728), and/or allowing application control over power relays (e.g., step 718).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for detecting and responding to disturbances in a HVAC system using a noisy measurement signal and a signal filter, the method comprising:
    detecting a deviation in the noisy measurement signal, wherein the noisy measurement signal measures a supply line voltage of the HVAC system;
    resetting the signal filter in response to the detected deviation exceeding a noise threshold, wherein resetting the signal filter comprises increasing a covariance parameter used by the signal filter to calculate a weight assigned to a current value of the noisy measurement signal, which causes the signal filter to assign a relatively lesser weight to a previous estimate of the supply line voltage and a relatively greater weight to the current value of the noisy measurement signal, thereby increasing a responsiveness of the signal filter to changes in the noisy measurement signal;
    filtering the noisy measurement signal using the reset signal filter to determine a new estimate of the supply line voltage;
    determining whether a disturbance has occurred by comparing the new estimate of the supply line voltage to both a brownout voltage threshold and a blackout voltage threshold less than the brownout voltage threshold, wherein both the brownout voltage threshold and the blackout voltage threshold are different from the noise threshold;
deactivating one or more active power relays in response to a determination that the new estimate of the supply line voltage is less than the blackout voltage threshold; and
preventing one or more inactive power relays from activating in response to a determination that the new estimate of the supply line voltage is between the blackout voltage threshold and the brownout voltage threshold.

2. The method of claim 1, further comprising:
performing a control action in response to the new estimate of the supply line voltage crossing a disturbance threshold, wherein the control action includes at least one of: modifying a setpoint for a device of the HVAC system and controlling an activation status of a device of the HVAC system.

3. The method of claim 2, wherein the disturbance threshold is at least one of the brownout voltage threshold and the blackout voltage threshold.

4. The method of claim 1, wherein the filter is a Kalman filter and wherein filtering the noisy measurement signal includes:
receiving an initial estimate for the supply line voltage and for an error covariance;
computing a Kalman gain using the error covariance; and
updating the initial estimate of the supply line voltage using the Kalman gain and a measured value received from a measurement device.

5. The method of claim 1, wherein the deviation in the noisy measurement signal is at least one of: a difference between two measured values in the noisy measurement signal, a difference between a measured value in the noisy measurement signal and a steady state value, and a standard deviation of two or more measured values in the noisy measurement signal.

6. The method of claim 1, wherein the noisy measurement signal is received from at least one of: a chiller, a boiler, an air handling unit, a flow controller, a field controller, a supervisory controller, an actuator, a signal relay, a temperature sensor, a pressure sensor, a voltage sensor, and a current sensor.

7. The method of claim 1, further comprising:
comparing the new estimate of the supply line voltage to a disturbance threshold; and
concluding that a disturbance has occurred if the new estimate of the supply line voltage is less than the disturbance threshold.

8. The method of claim 7, wherein the disturbance threshold is a two-tiered threshold including the brownout voltage threshold and the blackout voltage threshold.

9. The method of claim 7, wherein the supply line voltage is an AC voltage and an oscillatory period of the AC voltage defines a line cycle, wherein it is determined that a disturbance has occurred within three line cycles of the disturbance occurring.

10. The method of claim 1, wherein resetting the signal filter comprises increasing a process noise covariance parameter used by the signal filter to calculate the weight assigned to the current value of the noisy measurement signal.

11. A system for detecting and responding to disturbances using a noisy measurement signal and a signal filter, the system comprising:
a sensor configured to measure one or more values of a supply line voltage in an HVAC system, wherein the sensor produces a noisy measurement signal including the one or more measured values; and
a processing circuit configured to:
detect a deviation in the one or more measured values;
reset the signal filter in response to the detected deviation exceeding a noise threshold, wherein resetting the signal filter comprises increasing a covariance parameter used by the signal filter to calculate a weight assigned to a current value of the noisy measurement signal, which causes the signal filter to assign a relatively lesser weight to a previous estimate of the supply line voltage and a relatively greater weight to the current value of the noisy measurement signal, thereby increasing a responsiveness of the signal filter to changes in the noisy measurement signal;
filter the noisy measurement signal using the reset signal filter to determine a new estimate of the supply line voltage;
determine whether a disturbance has occurred by comparing the new estimate of the supply line voltage to both a brownout voltage threshold and a blackout voltage threshold less than the brownout voltage threshold, wherein both the brownout voltage threshold and the blackout voltage threshold are different from the noise threshold;
deactivate one or more active power relays in response to a determination that the new estimate of the supply line voltage is less than the blackout voltage threshold; and
prevent one or more inactive power relays from activating in response to a determination that the new estimate of the supply line voltage is between the blackout voltage threshold and the brownout voltage threshold.

12. The system of claim 11, wherein the processing circuit is further configured to:
perform one or more control actions in response to the new estimate of the supply line voltage crossing a disturbance threshold, wherein the control actions include at least one of: modifying a setpoint for a device of the HVAC system and controlling an activation status of a device of the HVAC system.

13. The system of claim 12, wherein the disturbance threshold is at least one of the brownout voltage threshold and the blackout voltage threshold.

14. The system of claim 11, wherein the filter is a Kalman filter and wherein the processing circuit is configured to:
receive an initial estimate for the supply line voltage and for an error covariance;
compute a Kalman gain using the error covariance; and
update the initial estimate of the supply line voltage using the Kalman gain and a value measured by the sensor.

15. The system of claim 11, wherein the deviation is at least one of: a difference between two of the measured values, a difference between one of the measured values and a steady state value, a variance of two or more of the measured values, and a standard deviation of two or more of the measured values.

16. The system of claim 11, wherein the sensor is configured to measure at least one of: a temperature, a pressure, a voltage, a flow rate, a power usage, and an electric current.

17. The system of claim 11, wherein the processing circuit is configured to:

compare the new estimate of the supply line voltage to a disturbance threshold; and determine that a disturbance has occurred if the new estimate of the supply line voltage is less than the disturbance threshold.

18. The system of claim 11, wherein resetting the signal filter comprises increasing a process noise covariance parameter used by the signal filter to calculate the weight assigned to the current value of the noisy measurement signal.

* * * * *